(12) United States Patent
Innocenti et al.

(10) Patent No.: US 7,385,309 B2
(45) Date of Patent: Jun. 10, 2008

(54) INNOVATIVE ARCHITECTURES FOR SYSTEMS FOR GENERATION AND DISTRIBUTION OF ENERGY ON BOARD MOTOR VEHICLES

(75) Inventors: Gianfranco Innocenti, Orbassano (IT); Pietro Perlo, Orbassano (IT); Cosimo Carvignese, Orbassano (IT); Luca Liotti, Orbassano (IT); Roberto Finizio, Orbassano (IT); Piermario Repetto, Orbassano (IT); Daniele Pullini, Orbassano (IT); Marco Pizzi, Orbassano (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 474 days.

(21) Appl. No.: 11/048,905

(22) Filed: Feb. 3, 2005

(65) Prior Publication Data

US 2005/0189771 A1  Sep. 1, 2005

(30) Foreign Application Priority Data

Feb. 4, 2004 (IT) .......................... TO2004A0054

(51) Int. Cl.
*B60K 1/00* (2006.01)
(52) U.S. Cl. .................. 307/10.1; 307/24; 290/52; 180/65.2
(58) Field of Classification Search .................. 307/24, 307/153, 38, 10.1; 180/65.1, 65.2, 65.3, 180/65.4, 65.8; 700/287; 290/52, 40 C, 290/40 A, 40 R
See application file for complete search history.

(56) References Cited

U.S. PATENT DOCUMENTS

| 4,597,363 | A | * | 7/1986 | Emelock ........................ 123/3 |
| 6,026,921 | A | * | 2/2000 | Aoyama et al. ........... 180/65.2 |
| 6,448,535 | B1 | | 9/2002 | Ap |

(Continued)

FOREIGN PATENT DOCUMENTS

EP  1 138 893 A  10/2001

(Continued)

OTHER PUBLICATIONS

A. Carlo Fernandez-Pello: "Micro-Power Generation Using Combustors: Issues and Approaches". Topical Review at the Twenty-Ninth International Symposium on Combustion, Jul. 21-26, 2002, Sapporo, Japan.

*Primary Examiner*—Michael J Sherry
*Assistant Examiner*—Andrew M Deschere
(74) *Attorney, Agent, or Firm*—Sughrue Mion, PLLC

(57) ABSTRACT

The system allows the generation and distribution of energy on board a motor vehicle provided with a propulsion unit, a tank for fuel at least one distribution network or line for electric energy, electrical energy generation devices connected to the at least one distribution network or line, and a plurality of selectively activatable electrical utiliser devices or apparatus connected or connectable to the at least one distribution network or line. The electrical energy generator devices includes (at least) a microcombustor electricity generator matrix or battery connected to the fuel tank, and a supervision and control unit associated with this generator matrix or battery and coupled to the distribution network or line and arranged to control the operation of the said generator matrix or battery in a predetermined manner as a function of the electrical power required or consumed by the said network or line.

10 Claims, 4 Drawing Sheets

U.S. PATENT DOCUMENTS

| | | |
|---|---|---|
| 6,554,088 B2 * | 4/2003 | Severinsky et al. ......... 180/65.2 |
| 6,580,180 B2 * | 6/2003 | Tamai et al. ................ 307/10.1 |
| 6,624,529 B2 * | 9/2003 | Obayashi .................. 290/40 C |
| 2002/0098397 A1 | 7/2002 | Chen et al. |
| 2002/0167227 A1 | 11/2002 | Matsunaga et al. |

FOREIGN PATENT DOCUMENTS

| | | |
|---|---|---|
| EP | 1 361 349 A2 | 11/2003 |

* cited by examiner

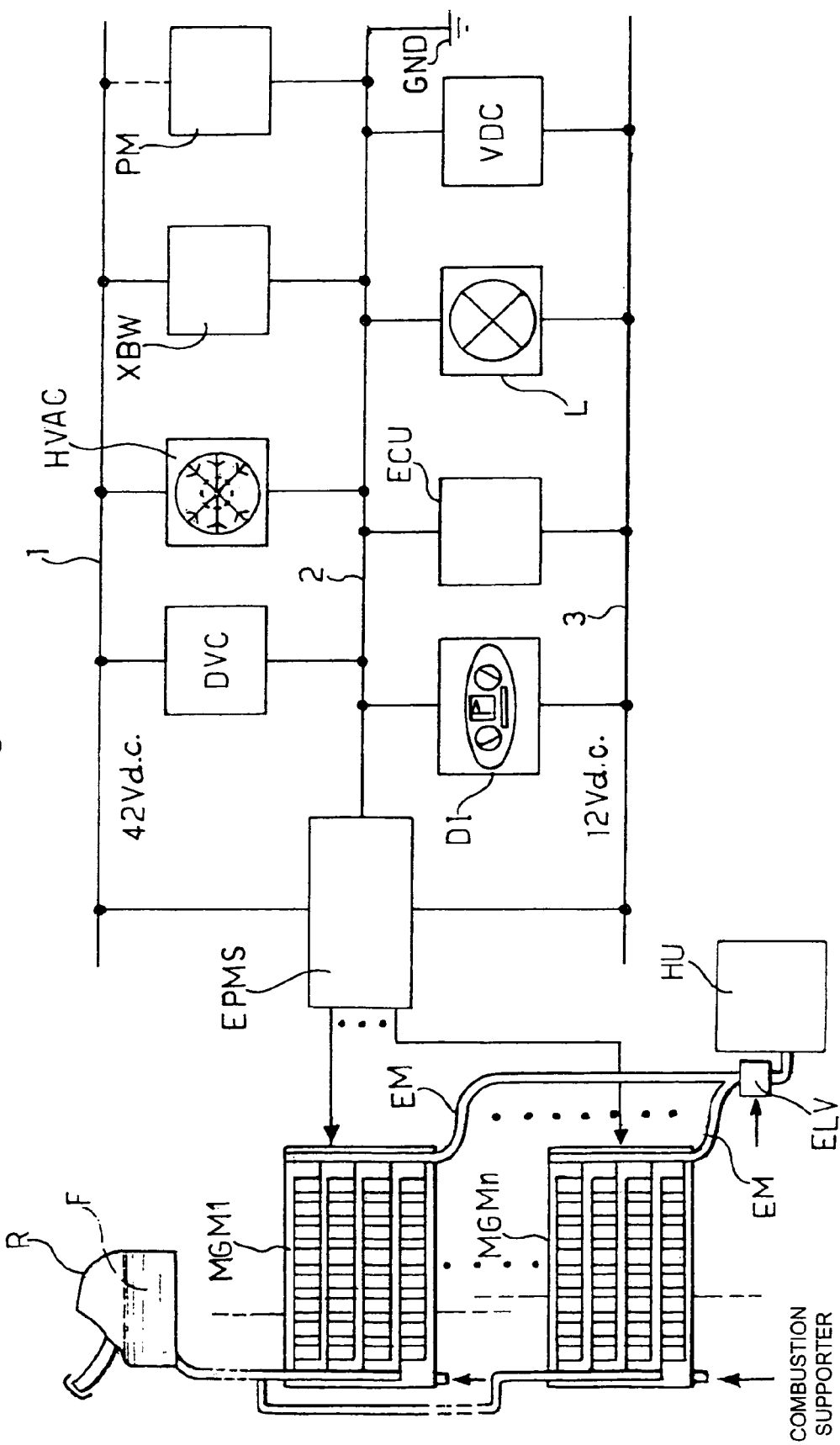

INNOVATIVE ARCHITECTURES FOR SYSTEMS FOR GENERATION AND DISTRIBUTION OF ENERGY ON BOARD MOTOR VEHICLES

BACKGROUND OF THE INVENTION

The subject of the present invention, is in general, innovative architecture for systems of generating and distributing energy on board motor vehicles.

More specifically, the invention relates to a system for generation and distribution of energy on board a motor vehicle provided with
- a propulsion unit,
- at least one fuel tank,
- at least one distribution network or line for electrical energy,
- means for generation of electrical energy connected to the said at least one distribution network or line; and
- a plurality of selectively activatable electrical consumer devices or apparatus, connected or connectable to the said at least one distribution network or line.

The architecture of the system most currently used in the automobile field for generation of mechanical and electrical energy envisages the use of a propulsion unit, typically an internal combustion engine, with an associated electrical starter motor, an electricity generator driven to rotate by the propulsion unit, and at least one accumulator battery, typically of the lead-acid type. The on-board electrical consumer devices and apparatus, such as, for example, the engine control system, the lighting installation, the ABS system etc, are supplied with electrical energy rendered available by the generator and/or the accumulator battery.

In this architecture the electricity generator, typically a three-phase alternator with associated bridge rectifier circuit, is driven to rotate by the propulsion unit. This creates problems in that this arrangement does not easily allow optimisation of the control and management strategies for operation of the propulsion unit for the purpose of reducing fuel consumption and the emission of pollutants, a decoupling of the function of the propulsion unit from that of the electrical apparatus or devices being, on the other hand desirable for this purpose. This problem is more important if it is considered that in the future a significant increase in the demand for electrical power on board vehicles from the current 2-3 kw to levels of the order of 10 kw are envisaged.

SUMMARY OF THE INVENTION

One object of the present invention is to propose innovative architectures for systems for generation and distribution of energy on board motor vehicles, which allows the achievement of improved efficiency both in terms of generation yield and in terms of management of the electrical users and simplification of the implementation of new functions.

This, and other objects, are achieved according to the invention with a system for generation and distribution of energy on board a motor vehicle, of the type specified above, characterised in that the said electrical energy generator means comprise
- at least one battery or matrix of microcombustor electricity generators, connected to the said at least one fuel tank, and
- a supervision and control unit associated with the said at least one battery or matrix of microcombustor electricity generators and coupled to the said at least one distribution network or line and arranged to control the operation of the said battery or matrix of generators in predetermined modes as a function of the electrical power required or consumed by the said at least one distribution network or line.

Micro-scale combustors and their applications are described for instance in A. Carlos Fernandez-Pello, "Micro-Power Generation Using Combustors: Issues and Approaches", Topical Review at the Twenty-Ninth International Symposium on Combustion, Jul. 21-26, 2002, Sapporo, Japan.

In one embodiment the propulsion unit of the motor vehicle is an internal combustion engine and the said at least one battery or matrix of microcombustor generators has an exhaust manifold selectively connectable to this internal combustion engine in such a way that the exhaust gases from the microcombustors of the said battery or matrix of generators are able to cause starting of this internal combustion engine. In such a system it is therefore conveniently possible to do away with the conventional electric starter motor associated with the internal combustion engine.

In one implementation of the invention on board a motor vehicle which is provided with a heater unit including a heat exchanger of gas/air type, the said at least one battery or matrix of microcombustor generators conveniently has an exhaust manifold selectively connectable in a controlled manner to the said heat exchanger.

An exhaust manifold or duct of the said at least one battery or matrix of microcombustor generators may conveniently be coupled to a magnetohydrodynamic effect electricity generator, for example of the type described in earlier U.S. patent application Ser. No. 11/014839 in the name of the same Applicant, the electrical output of which is coupled to the said at least one electrical energy distribution network or line of on board the motor vehicle.

Other types of electricity generators suitable for the purpose are those described for example in European patent applications 04030126.9 and 04029814.3 or the thermophotovoltaic effect generators according to Italian patent application TO2002A000375, all in the name of the same Applicant.

The or each batter of microcombustor generators may in general comprise an array of M×N microcombustors disposed in M rows and N columns and electrically connected together for example in series by columns and in parallel by rows.

Such a battery or matrix of generators is conveniently associated with a supervision and control unit (management controller) arranged to determine an electrical output with predetermined current and voltage characteristics and which can be modulated through a suitable selection of the number of generators which are made active. The electrical output can for example be varied by steps of 2 volts by varying the number of activated microgenerators.

BRIEF DESCRIPTION OF THE DRAWINGS

In an alternative specific embodiment for a motor vehicle the propulsion unit of which is an electric machine, this motor can be supplied with electrical energy generated by the said at least one battery or matrix of microcombustor electricity generators, for example of the type known from the above cited preceding patent applications.

Further characteristics and advantages of the invention will become apparent from the following detailed description which is given purely by way of non-limitative example, with reference to the attached drawings, in which:

FIGS. 2 to 4 are block diagram representations of variant embodiments of the system according to the invention.

DETAILED DESCRIPTION OF THE INVENTION

Figure 1:
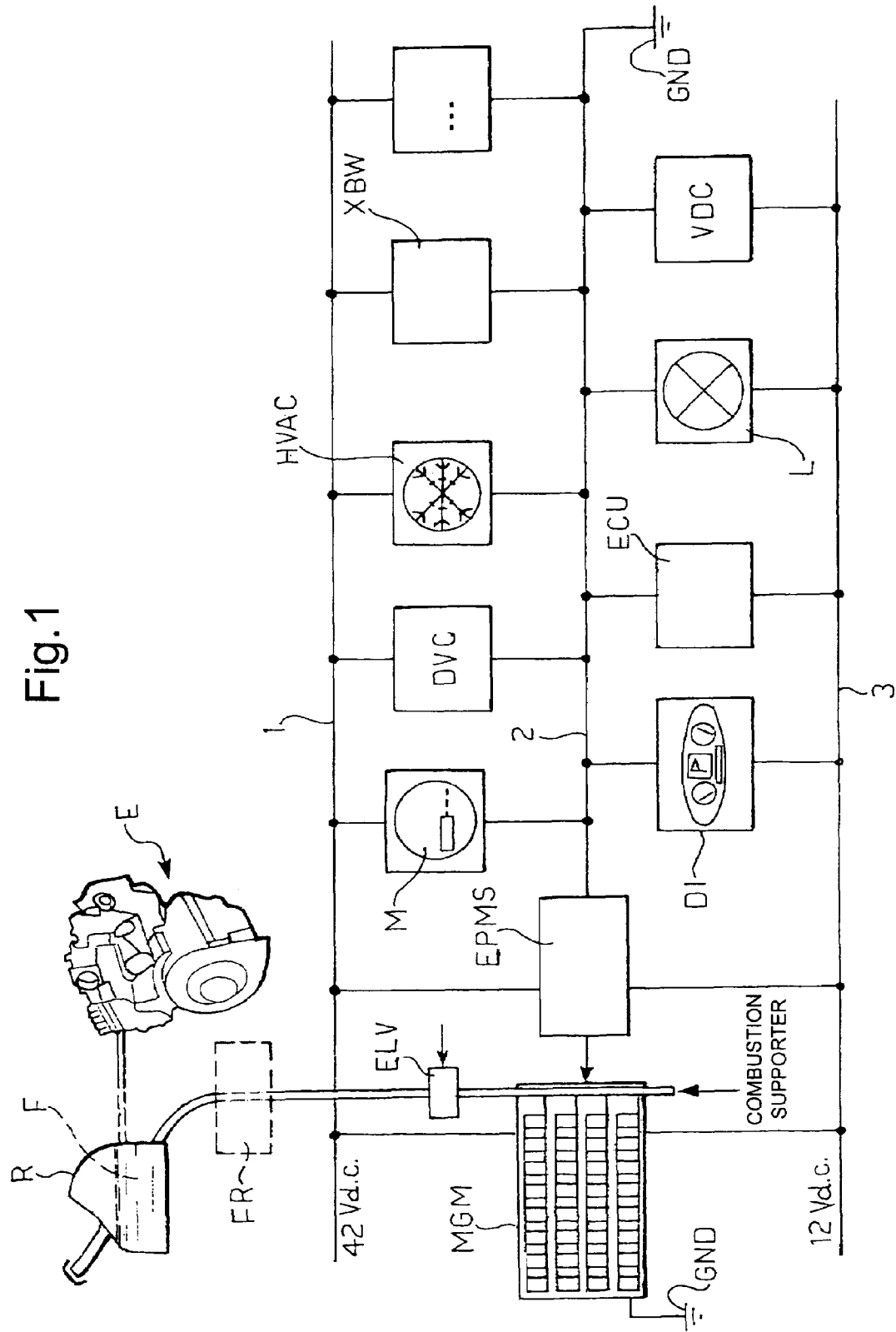
FIG. 1 is a block diagram representation of the structure of a first system for generation and distribution of energy on board a motor vehicle according to the invention.

In FIG. 1 the propulsion unit of the motor vehicle provided with a system for generation and distribution of electrical energy according to the invention is indicated E.

The propulsion unit E is, for example, an internal combustion engine of traditional type, supplied with fuel F from a tank R. This fuel may be, for example, petrol, diesel, methane or liquefied petroleum gas (LPG) or even hydrogen.

In the exemplary embodiment illustrated the system comprises two electrical energy distribution lines at different voltages (for example at 42V d.c. and 12V d.c. respectively) and, in particular, one line including two conductors 1 and 2 of which the second is connected to ground GND and the second line including the conductor 2 and a further conductor indicated 3.

A plurality of selectively activatable electrical consumer devices or apparatus are connected to the distribution lines 1-2 and 2-3.

In the exemplary representation of FIG. 1 these devices or apparatus comprise an electric starter motor M, a system for the direct control of valves or injectors DVC, an air conditioning, ventilation and heater system HVAC, devices XBW for control of the functions in a so-called "by-wire" manner, and possible others connected to the line 1-2.

Other devices, such as on-board indicator instrument DI, an engine control unit ECU, lights or lamps and other optical indicators L, systems VDC for the control of vehicle dynamics etc are similarly associated with the distribution line 2-3.

The system shown in FIG. 1 comprises (at least) one battery or matrix MGM of microcombustor electricity generators, supplied with a combustion supporter, for example oxygen or air, and with a fuel which may be the fuel F coming directly from the tank R or a derived fuel, for example hydrogen obtained from a reformer FR supplied at its input with the fuel F.

The matrix MGM of electricity generators may include, for example, a plurality of microcombustor generators of a type known from the patent application mentioned above, as well as the type described in the earlier U.S. patent application Ser. No. 10/980153, again in the name of the same Applicant.

In the matrix MGM the microcombustors or at least groups of these, are connected together fluidically in parallel, and the associated converter means which provide electrical energy at the output are conveniently connected together in series. Other modes of fluid and/or electrical connection are however possible.

Associated with the electricity generator matrix MGM is an electronic control unit EPMS which supervises the management and generation of energy.

The control unit EPMS is moreover connected to the lines 1-2 and 2-3. This unit, which can be formed using microprocessors, is conveniently arranged to control the functioning of the battery or matrix MGM of generators in predetermined modes as a function of the instantaneous electrical power requirements for the power consumed by the distribution lines and the devices and apparatus connected to it.

The unit EPMS is in particular arranged to modulate the electrical power generated by the matrix MGM of generators via a modulation of the number of microcombustor electricity generators activated from time to time, and/or by modulating the rate of flow of fuel F and/or of combustion supporter supplied to the matrix MGM via controlled solenoid valve devices such as those indicated ELV.

As can be immediately appreciated by observing FIG. 1, with the above-described system the motor vehicle can be formed without need for the traditional on-board electricity generator (alternator) and the associated accumulator battery.

Moreover, the system makes it possible to de-couple the function of the propulsion unit E from that of the electrical utilisers. This makes it possible to optimise the control and management strategies for operation of the engine E, with consequent reduction in fuel consumption and polluting emissions.

Figure 2:
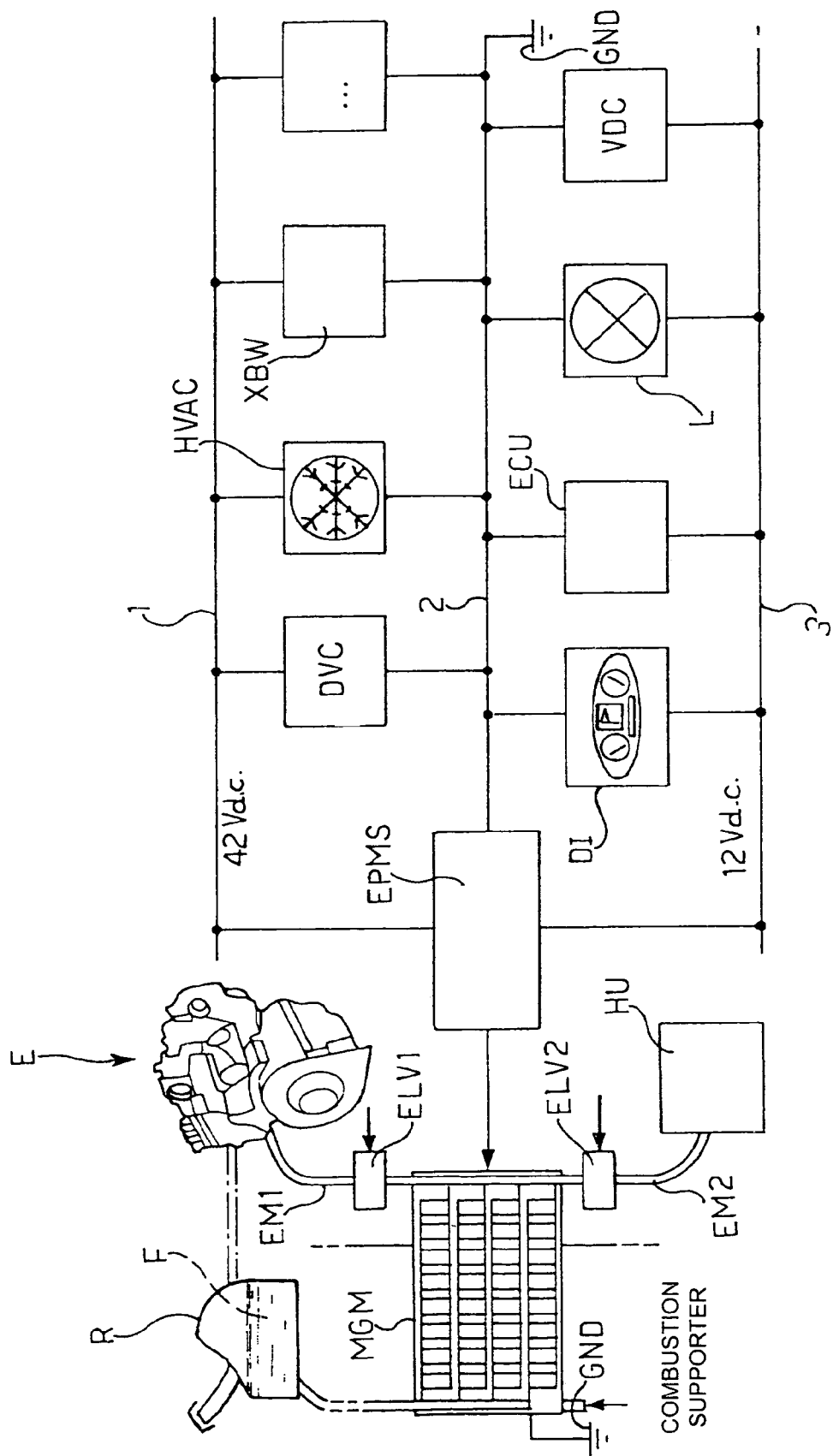

In FIG. 2 is shown a variant embodiment of a system according to the invention. In this Figure the same or substantially equivalent parts and components as those already described have again been attributed the same alphabetic or numeric reference symbols.

In the embodiment of FIG. 2 the battery or matrix of generators MGM has an exhaust manifold EM1 coupled to the internal combustion engine E, for example by means of a solenoid valve device ELV1 controlled by the unit EPMS in such a way that the exhaust gases from the microcombustors of the battery or matrix MGM of generators, or at least one of them, are capable of causing starting of the internal combustion engine.

For a motor vehicle provided with a heater unit HU including a heat exchanger of gas/air type, of type known per se, the battery or matrix MGM of generators may conveniently have an exhaust manifold such as that indicated EM2 in FIG. 2, selectively connectable to the said heat exchanger, for example by means of a solenoid valve device ELV2, likewise controlled by the unit EPMS. This arrangement, graphically shown in FIG. 2, can however be adopted even in a system of the type according to FIG. 1 described above.

Figure 3:
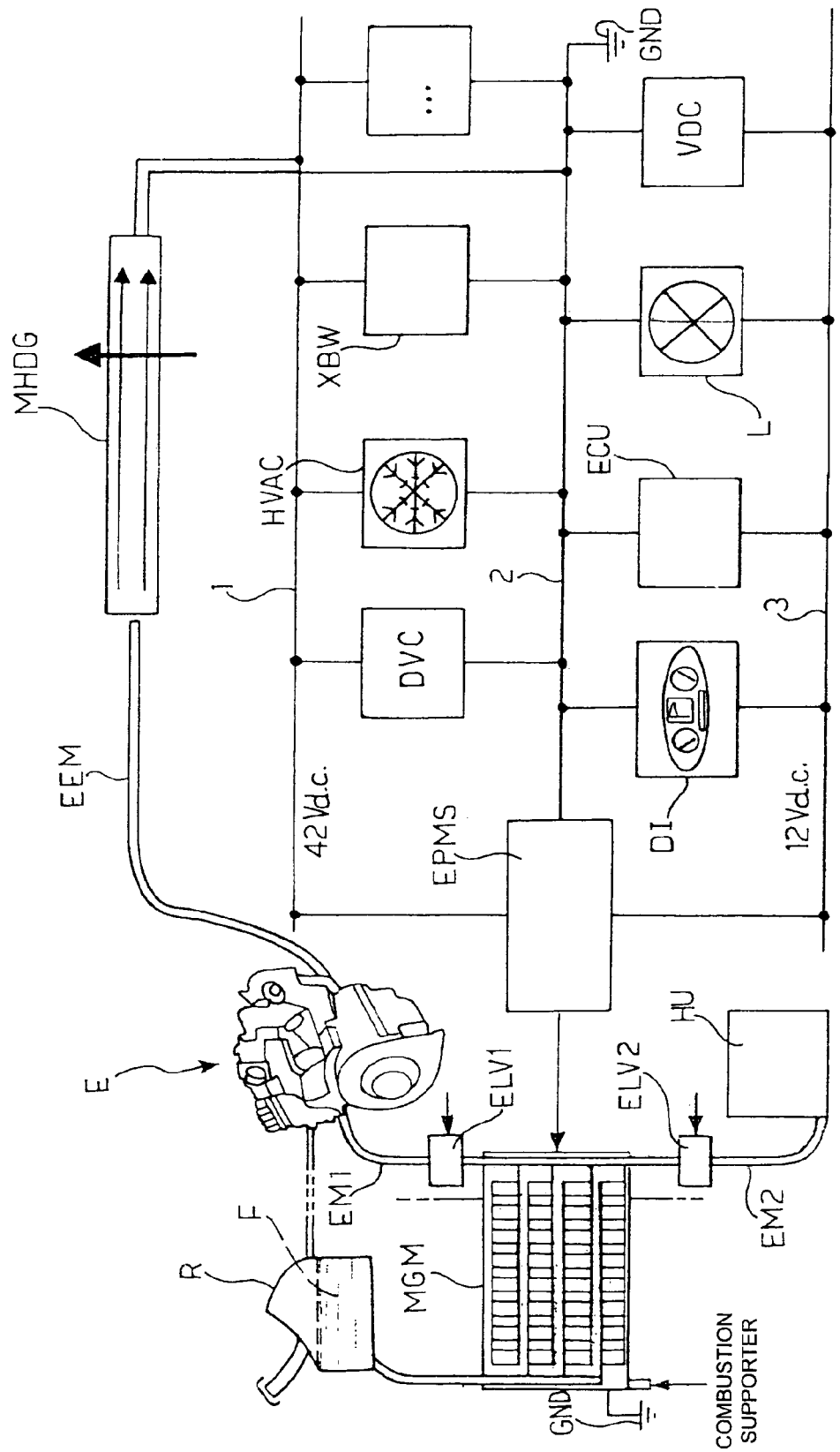

In FIG. 3 there is schematically illustrated a further variant embodiment of a system according to the invention. In this Figure the same or substantially corresponding elements or components as those described already have again been attributed the same alphanumeric references used previously.

In the variant according to FIG. 3, an exhaust manifold EME of the internal combustion engine E is coupled to the inlet of a magnetohydrodynamic effect electricity generator MHDG, the electrical output of which is coupled to at least one of the distribution lines 1-2 and 2-3.

The magnetohydrodynamic effect electricity generator MHDG can be of one of the types described in any of the patent documents cited in the introduction to the present description, or of other type known per se.

The coupling of the exhaust manifold of the engine E to a magnetohydrodynamic effect electricity generator can also be achieved in a system of the type illustrated with reference to FIG. 1 described above.

As an alternative to the arrangement just described with reference to FIG. 3, the exhaust manifold EEM of the engine E can be coupled to the input of a high kinetic energy positive ion electricity generator, the positive ions of which are obtained from the plasma produced by the combustion reaction and separated from the electrons for example by means of a neutralisation or masking grille.

In a further alternative the exhaust manifold EEM of the engine E can be coupled to the input of an electricity generator operating in a detonation, impulsed or continuous regime, or a magnetic suspension rotary generator operating by combustion in a deflagration or detonation regime, or still further, to the input of an electricity generator of the magnetic micropiston type, or to a generator operating in a confined combustion regime in which the control of the reagents is obtained in cavities which contribute to "selection" of the kinetics of the chemical and physical reaction.

In FIG. 4 there is shown a variant embodiment of a system according to the invention for use in a motor vehicle the propulsion of which can be achieved by means of an electric machine PM fed with the electrical energy generated by a plurality of batteries or microcombustor electricity generator matrices indicated MGM1-MGMn.

In FIG. 4, also, the components already described have again been allocated to the same alphanumeric reference symbols.

The electric propulsion machine PM can be used as the sole vehicle propulsion unit (electric vehicle) or as an alternative to an internal combustion engine of traditional type (hybrid vehicle).

Naturally, the principle of the invention remaining the same, the embodiments and details of construction can be widely varied with respect to what has been described and illustrated purely by way of non-limitative example, without by this departing from the ambit of the invention as defined in the annexed claims.

What is claimed is:

1. A system for generation and distribution of energy on board a motor vehicle provided with
   a propulsion unit;
   at least one tank for fuel;
   at least one distribution network or line for electric energy;
   electrical energy generation means connected to said at least one distribution network or line; and
   a plurality of selectively activatable electrical utiliser devices or apparatus connected or connectable to said at least one distribution network or line;
   said electrical energy generation means comprising
   at least one battery or matrix of microcombustor electricity generators connected to said at least one fuel tank, and
   a supervision and control unit associated with said at least one battery or matrix of microcombustor electricity generators and coupled to the said at least one distribution network or line and arranged to control the operation of the said battery or matrix of generators in a predetermined manner as a function of the electrical power required or consumed by the said at least one line or network, wherein said propulsion unit is an internal combustion engine and wherein said at least one battery or matrix of microcombustor generators has an exhaust manifold selectively connectable to the internal combustion engine in such a way that the exhaust gases from the microcombustors of the battery or matrix of generators are able to cause starting of the said internal combustion engine.

2. A system according to claim 1, for a motor vehicle provided with a heater unit including a heat exchanger of the gas/air type, and said at least one battery or matrix of generators has an exhaust manifold selectively connectable in a controlled manner to the said heat exchanger.

3. A system according to claim 1, wherein said propulsion unit is an internal combustion engine having an exhaust manifold or duct coupled to a magnetohydrodynamic effect electric generator the electricity output of which is coupled to the said at least one distribution network or line.

4. A system according to claim 1, wherein said propulsion unit is an internal combustion engine having an exhaust manifold or duct in coupled to a high kinetic energy positive ion electricity generator obtained by masking with a grille the electrons produced by a combustion reaction, the electrical output of which is coupled to the said at least one distribution network or lines.

5. A system according to claim 1, wherein said propulsion unit is an internal combustion engine having an exhaust manifold or duct coupled to an electricity generator operating in a detonation, impulsed or continuous regime, the electrical output of which is coupled to the said at least one distribution network or line.

6. A system according to claim 1, wherein said propulsion unit is an internal combustion engine having an exhaust manifold or duct coupled to an electricity generator of the magnetically suspended rotary type, operating by combustion in a deflagration or detonation regime, the electric output of which is coupled to the said at least one distribution network or line.

7. A system according to claim 1, wherein said propulsion unit is an internal combustion engine having an exhaust manifold or duct coupled to a magnetic micropiston electricity generator the electrical output of which is coupled to the said at least one distribution network or line.

8. A system according to claim 1, in wherein said propulsion unit is an internal combustion engine having an exhaust manifold or duct coupled to an electricity generator operating in a confined combustion regime in which the control of the reagents is achieved in cavities which contribute to the selection of the chemical and physical reaction kinetics, the electrical output of which is coupled to the said at least one distribution network or line.

9. A system according to claim 1, including an electric machine supplied with the electrical energy generated by the said at least one battery or matrix of microcombustor electricity generators.

10. A system according to claim 1, wherein said battery or matrix of microcombustor generators comprises M×N generators disposed in M rows and N columns with M and N equal or different from one another, groups of the said generators being connected electrically together in parallel or in series.

* * * * *